(12) United States Patent
Allio

(10) Patent No.: US 9,927,624 B2
(45) Date of Patent: Mar. 27, 2018

(54) DISPLAY SCREEN, IN PARTICULAR FOR AUTOSTEREOSCOPY

(71) Applicant: Alioscopy, Paris (FR)

(72) Inventor: Pierre Allio, Paris (FR)

(73) Assignee: ALIOSCOPY, Paris (FR)

( * ) Notice: Subject to any disclaimer, the term of this patent is extended or adjusted under 35 U.S.C. 154(b) by 1191 days.

(21) Appl. No.: 13/632,590

(22) Filed: Oct. 1, 2012

(65) Prior Publication Data

US 2014/0078025 A1    Mar. 20, 2014

(30) Foreign Application Priority Data

Sep. 14, 2012  (FR) ..................................... 12 58657

(51) Int. Cl.
*G02B 27/22* (2018.01)
*H04N 13/04* (2006.01)

(52) U.S. Cl.
CPC ..... *G02B 27/2214* (2013.01); *H04N 13/0402* (2013.01); *H04N 13/0422* (2013.01)

(58) Field of Classification Search
CPC ...... H04L 3/00; G02B 27/22; H04N 2013/00; H04N 2213/00
See application file for complete search history.

(56) References Cited

U.S. PATENT DOCUMENTS

2006/0176245 A1    8/2006  Sakai et al.
2008/0204455 A1    8/2008  Allio
2011/0141560 A1    6/2011  Kim et al.
2011/0248994 A1*  10/2011  Van Der Horst et al. .... 345/419
2012/0200562 A1*   8/2012  Kashiwagi et al. .......... 345/419
2012/0281273 A1*  11/2012  Shinkai et al. ............... 359/315
2013/0002974 A1*   1/2013  Minato et al. ................. 349/43

FOREIGN PATENT DOCUMENTS

CN    101 511 035 A       8/2009
EP      1 779 181 B1      5/2007
WO    WO 2010/019923 A1   2/2010

OTHER PUBLICATIONS

Preliminary Search Report for French Application No. FR 1258657 dated Apr. 26, 2013

* cited by examiner

*Primary Examiner* — William Boddie
*Assistant Examiner* — Jeffrey A Parker
(74) *Attorney, Agent, or Firm* — Steven M. Greenberg, Esq.; CRGO Law

(57) ABSTRACT

A display screen (E), advantageously of the flat type, comprising a matrix of pixels (P) arranged in rows and columns perpendicular to said rows, each pixel comprising three or more sub-pixels (SP) of different colors (RGB), in alignment in the direction of said rows and presenting a shape that is elongate, the screen being characterized in that each said sub-pixel presents a main dimension forming a non-zero angle α relative to the direction of said columns. The screen may advantageously be fitted with an angle selection array for autostereoscopic display having main axes forming an angle α relative to the direction of said columns and at a pitch that enables M≥2 sub-pixels to be covered.

9 Claims, 9 Drawing Sheets

DISPLAY SCREEN, IN PARTICULAR FOR AUTOSTEREOSCOPY

FIELD

The invention relates to a display screen, and in particular to a flat TV, computer, or similar screen that is capable, for given resolution, of obtaining better apparent image quality than a conventional screen. A screen of the invention is particularly suitable for autostereoscopic display, in particular using the technique described in document EP 1 779 181 in the name of the Applicant. Nevertheless, the use of the invention is found to be advantageous even in non-autostereoscopic applications.

The invention may be applied to screens of various types, providing they have a matrix of pixels, each pixel being made up of sub-pixels of different colors. By way of example, mention may be made of liquid crystal display (LCD) screens, plasma screens, organic light-emitting diode (OLED) screens, etc.

BACKGROUND

Conventional display screens, and in particular flat screens, are constituted by a rectangular light-emitting surface that is subdivided into vertical columns and horizontal rows. The columns and rows are made up of pixels, themselves being made up of sub-pixels of three different colors, generally red, green, and blue ("RGB screen"). Some screens make use of a number N of sub-pixels, and thus of colors, per pixel that is greater, e.g. four: red, green, blue, and yellow; or red, green, blue, and white.

The sub-pixels are generally in the form of small colored rectangles, or else they are more complex in structure, usually being inscribed in a rectangle, presenting a height that is about N times greater than their width so as to form pixels that are square, or more generally that are arranged in a grid having a square mesh.

The principle generally implemented consists in having columns of same-color sub-pixels extending over the full height of the screen, and in juxtaposing those columns horizontally. Thus, when considered along the vertical axis of a column, the short sides of the rectangles representing same-color sub-pixels are adjacent from one row to the next; they may be directly touching or they may be separated by a black line in order to increase the contrast of the image. Similarly, along the horizontal axis, the long sides of the rectangles are surrounded by rectangles of colors that are different, and they may also be spaced apart by black lines for increasing the contrast of the image.

Such a conventional structure is shown in FIG. 1, where reference P designates a pixel, SP designates a sub-pixel, C a column, L a row, ZN a black zone between two sub-pixels, and R, V, and B correspond to the sub-pixel colors: red, green, and blue.

FIG. 1 relates to the simplest configuration, in which the sub-pixels are rectangular. In commercially available screens there can be observed sub-pixels that present shapes that are complex (chevrons, double chevrons, combinations of squares and rectangles, etc.) with subdivisions that have been developed to improve the uniformity in brightness and contrast, observation angle, and more generally the apparent quality of the displayed image—i.e. the quality actually perceived by an observer. In particular with technologies that make use of liquid crystals, it is necessary to subdivide a sub-pixel into smaller entities, sometimes that are specifically addressable, each having different directional light efficiency. Even when the sub-pixels present a shape that cannot be inscribed in a rectangle (as in the Samsung LTI460HM03 screen, in which they have a double-chevron shape and in which they are interleaved), each sub-pixel of a row L is contiguous above and below with sub-pixels of the same color in rows L−1 and L+1.

That conventional structure leads to artifacts, particularly when the screen is observed from a short distance: black spaces between the rows can become visible, colored fringes can appear, etc. In addition, when such a screen is used with an angle selection array such as an array of cylindrical lenses for producing an autostereoscopic display, as explained in document EP 1 779 181, other artifacts are liable to appear, such as moiré patterns.

SUMMARY

The invention seeks to overcome those drawbacks of the prior art.

In accordance with the invention, such an object is achieved by modifying the structure of the screen in such a manner that the sub-pixels, of elongate shape, slope relative to the vertical. Thus, the screen no longer appears to be made up of columns of same-color sub-pixels separated by black lines that are vertical and continuous. This leads to the above-mentioned artifacts disappearing or at least being attenuated, since the human visual system is more sensitive to structures having an orientation that is vertical or horizontal than to structures of sloping orientation.

Thus, the invention provides a display screen comprising a matrix of pixels arranged in rows and columns perpendicular to said rows, each pixel comprising three or more sub-pixels of different colors, in alignment in the direction of said rows and presenting a shape that is elongate, the screen being characterized in that each said sub-pixel presents a main dimension forming a non-zero angle $\alpha$ (preferably lying in the range 5° to 20°, approximately) relative to the direction of said columns.

In various embodiments of the invention:

- The top and bottom ends of each sub-pixel, with the exception of those in the first and the last rows, face: either, respectively, bottom and top ends of sub-pixels belonging to other rows and presenting other colors; or else black regions of the screen.
- The barycenters of the sub-pixels of any one color belonging to different rows are in alignment in the direction of said columns, such that there is no offset in translation of sub-pixels compared with a prior art screen.
- Said sub-pixel is surrounded by four sub-pixels, two in the direction of said main dimension and two in a perpendicular direction, the surrounding sub-pixels being of colors different from the color of said sub-pixel. This contributes to improving the apparent quality of images, by increasing their uniformity.

In a first embodiment of the invention, each said sub-pixel is inscribed within a parallelogram (other than a rectangle) having short sides oriented in the direction of said rows.

In a second embodiment of the invention, each sub-pixel is inscribed within a rectangle having short sides forming an angle $\alpha$ relative to the direction of said rows. Thus, instead of forming horizontal lines, the spacing between the rows is made up of segments that are sloping, and therefore less visible.

As in known screens of the prior art, the adjacent sub-pixels are separated by black spaces.

Said angle $\alpha$ may be given by the equation:

$$\alpha = (1+\epsilon)\tan^{-1}(1/N)$$

where ϵ is a parameter lying in the range −0.1 to +0.1, and N is the number of sub-pixels included in each pixel.

The sub-pixels that are adjacent in the direction of said rows may be separated by black spaces of width substantially equal to the width of a sub-pixel, and said angle α may then be given by the equation:

$$\alpha=0.5(1+\epsilon)\tan^{-1}(1/N)$$

where ϵ is a parameter lying in the range −0.1 to +0.1, and N is the number of sub-pixels included in each pixel.

Such a display screen may be fitted with an angle selection array or optical selector (lens array, parallax barrier, etc.) for autostereoscopic display having main axes forming an angle α relative to the direction of said columns and at a pitch that enables M≥2 sub-pixels to be covered.

Such a display screen may in particular be of the flat type.

BRIEF DESCRIPTION OF THE DRAWINGS

Other characteristics, details, and advantages of the invention appear on reading the following description made with reference to the accompanying drawings given by way of example, and in which.

DETAILED DESCRIPTION

Figure 1:
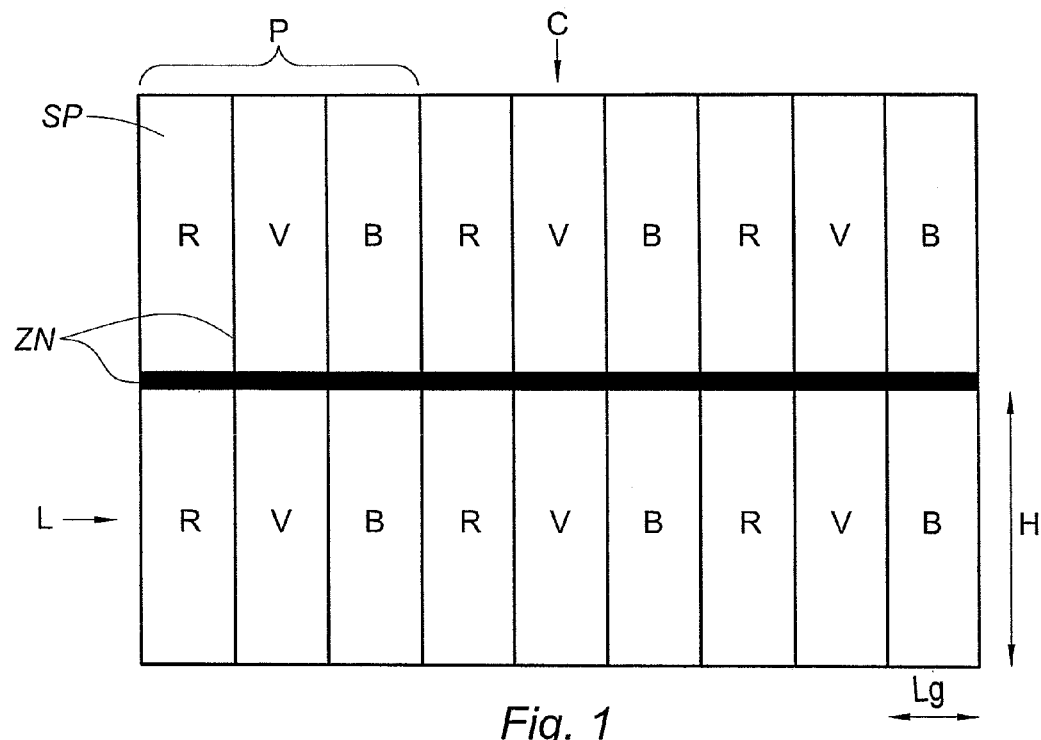
FIG. 1 shows the structure of a conventional display screen.
Figure 2:
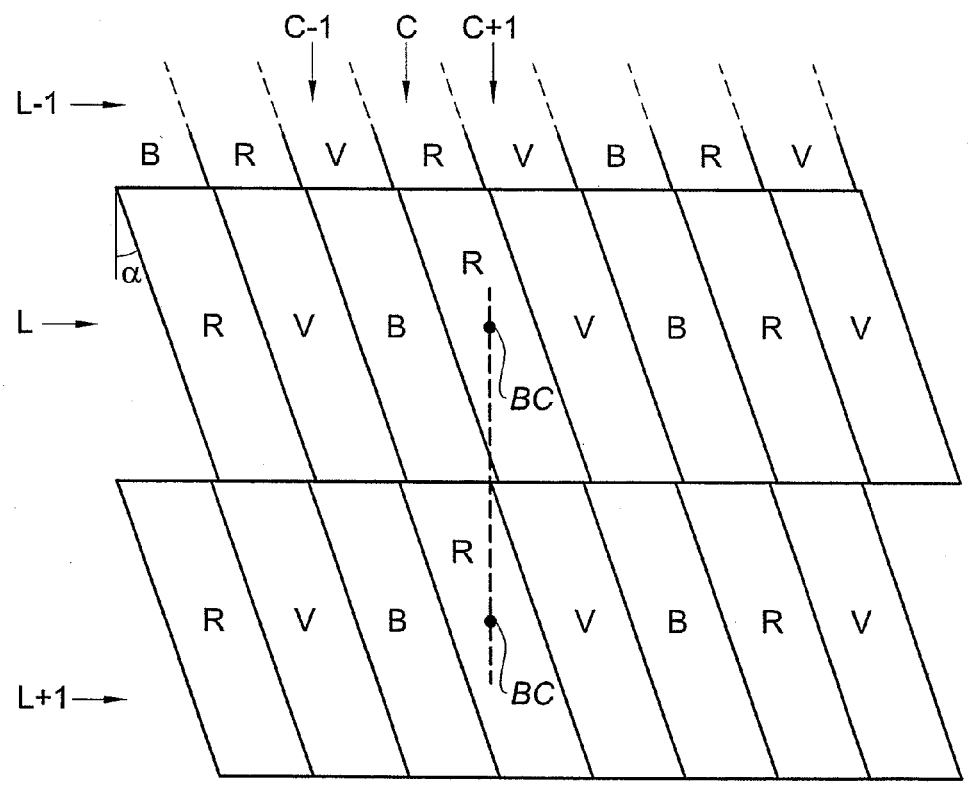
FIG. 2 shows the structure of a screen in a first embodiment of the invention, characterized by sub-pixels that are inscribed in respective envelopes in the form of parallelograms presenting long sides that are sloping and short sides that are horizontal.

FIG. 2 shows the structure of a three-color screen of the RGB type derived from the screen of FIG. 1 by deforming each sub-pixel so as to give it a parallelogram shape. The top and bottom short sides of each sub-pixel are moved respectively to the left and to the right, and the long sides slope at an angle α—equal to 18.43° (in decimal notation, i.e. 18 degrees and 43 hundredths of a degree)—relative to the vertical. In the particular example of FIG. 2, the relative movement of the short sides is substantially equal to the width of one sub-pixel. Thus, the short side at the top of the (blue) sub-pixel of the row L and of the column C is in register with the short side at the bottom of the (green) sub-pixel of the row L−1 and of the column C−1. Likewise, the short side at the bottom of the sub-pixel of the row L and of the column C is in register with the short side at the top of the (red) sub-pixel of the row L+1 and of the column C+1. The symmetrical configuration could equally well be adopted.

In this way, the black lines vertically separating the sub-pixels become broken lines made up of short segments at an angle of about 18.43° to the vertical.

It should be observed that the sub-pixels appear to form columns that slope at about 18.43° relative to the vertical, changing color on each change of row in a circular permutation over the full height of the screen. However, when it is the barycenters BC (i.e. the centers of gravity) of the sub-pixels having the same color (e.g. red) that are taken into consideration, it can be seen that they remain in alignment on a vertical axis, as in the configuration of FIG. 1.

The ideal value for the angle α is given by the following equation: $\alpha=\tan^{-1}(1/N)$, where N is the number of sub-pixels per pixel, or in approximately equivalent manner—so long as the width of the black lines separating the sub-pixels vertically and horizontally is not too great—the ratio of the height H divided by the width Lg of the sub-pixels (it should be observed that the values H and Lg can be difficult to define for sub-pixels of shape that is complex). More generally, it is possible to accept a departure of about 10% from this ideal value, thus giving $\alpha=(1+\epsilon)\tan^{-1}(1/N)$, where ϵ lies in the range −0.1 to +0.1.

Figure 6:
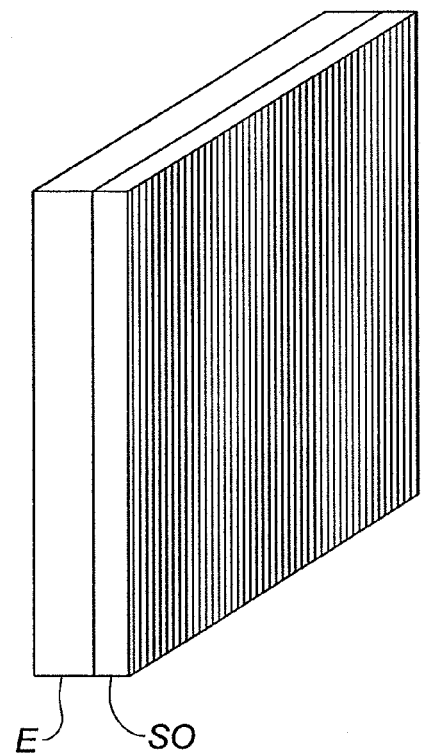
FIG. 6 shows a screen of the invention, fitted with an angle selection grating for autostereoscopy.
Figure 7A:
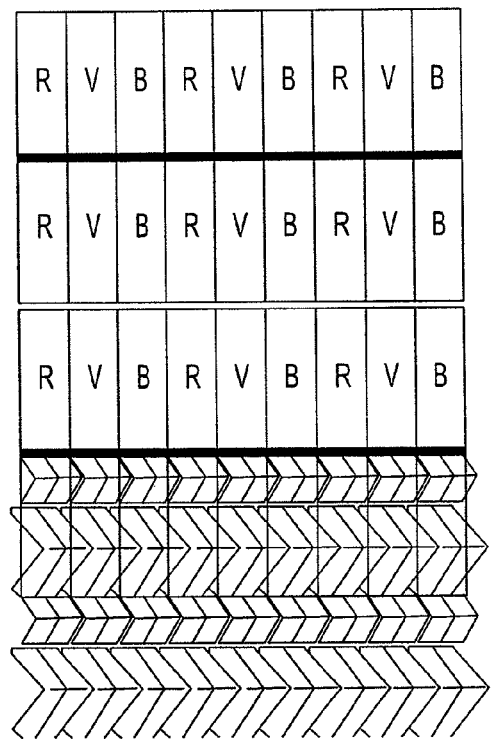
FIGS. 7a to 7e show examples of known prior art screens presenting sub-pixels of complex shape.
Figure 7B:
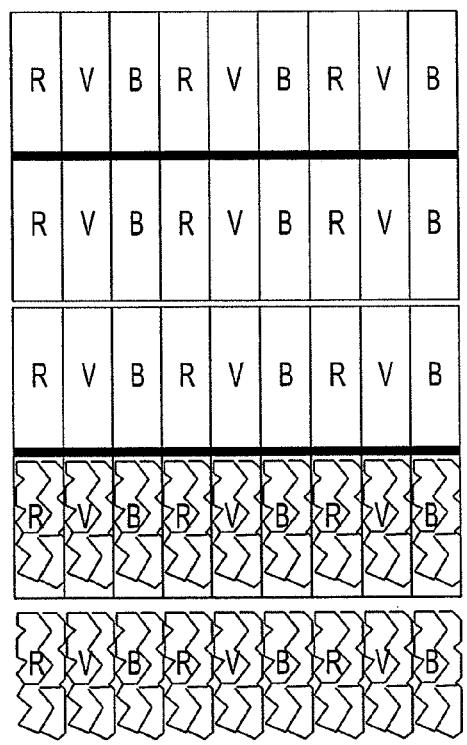
Figure 7C:
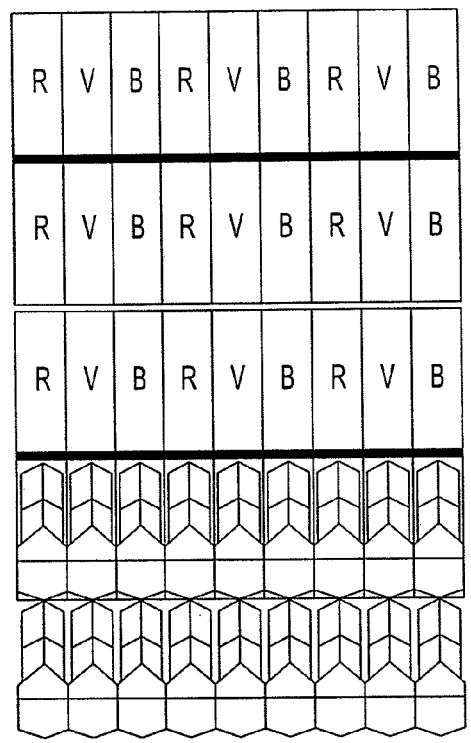
Figure 7D:
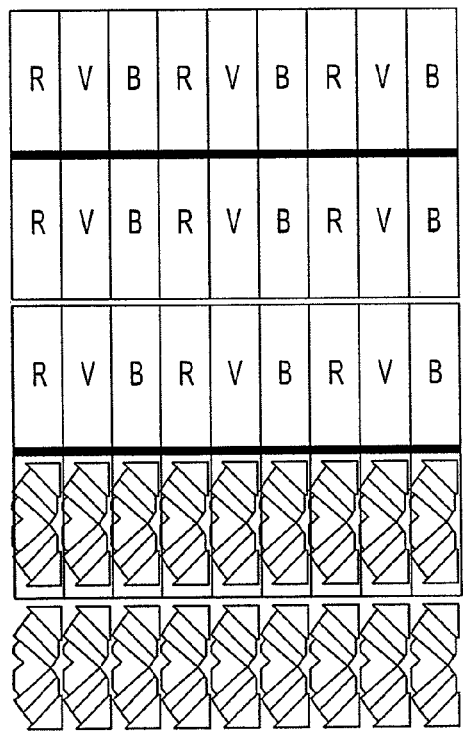
Figure 7E:
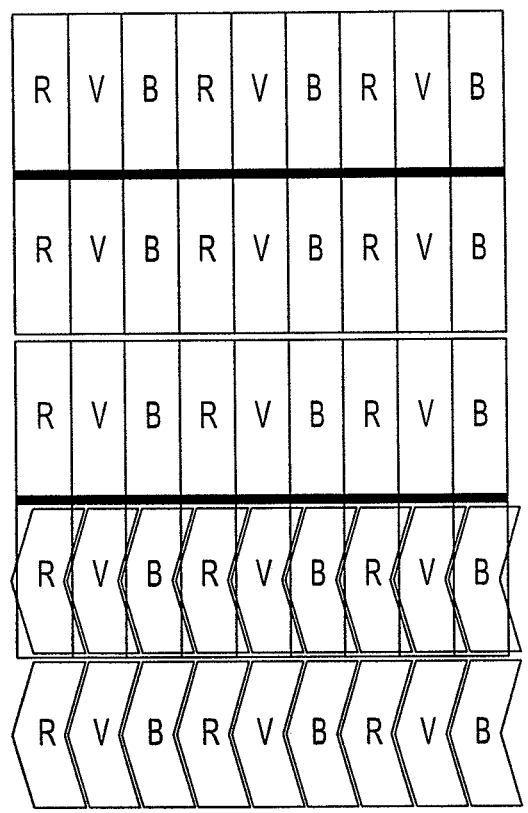

This system has two useful effects. Firstly, the vertical and continuous appearance of the spaces between sub-pixels is broken, which appearance can be visible close up. Secondly, the screen is optimized for autostereoscopic applications by very significantly improving the separating power of the optical selectors used (lens arrays, parallax barriers, etc.). In this respect, it should be observed that the angle α corresponds exactly to the optimum slope for main axes of an angular selection array for stereoscopic display, as defined by above-mentioned document EP 1 779 181. In highly diagrammatic manner, FIG. 6 shows a screen E of the invention fitted with an optical selector (lens array) SO. In known manner, the pitch of the array serves to cover a number M≥2 sub-pixels equal to the number of viewpoints displayed on the screen.

Figure 3A:
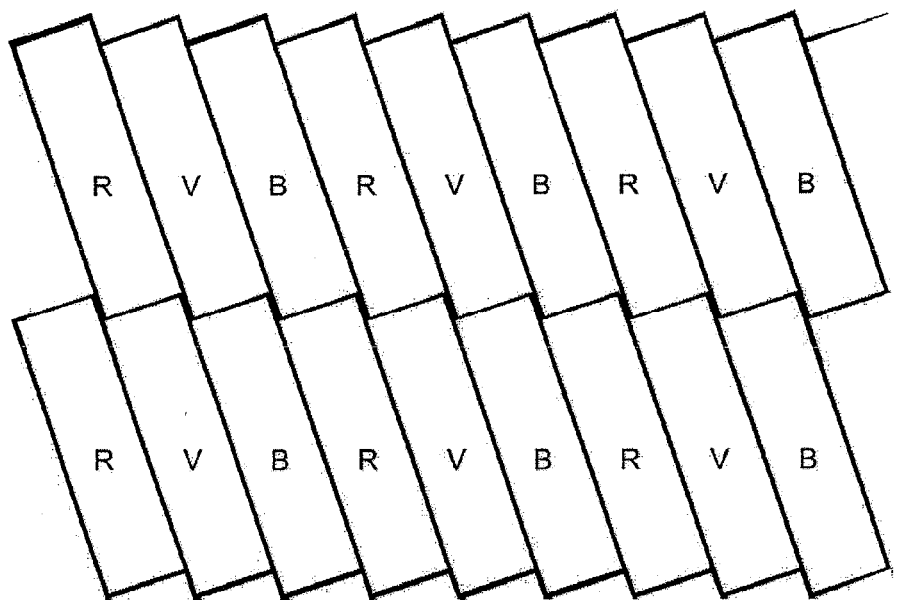
FIG. 3a shows the structure of an RGB screen in a second embodiment of the invention, characterized by sub-pixels that are inscribed in respective envelopes in the form of rectangles having four sloping sides.

FIG. 3a shows a second embodiment of the invention, obtained by applying rotation to the short sides of the sub-pixels that is equivalent to the rotation applied to their long sides, i.e. rotation through about α=18.43°, so as to reconstitute rectangles and break the horizontal alignment of the black spaces between the rows. Thus, without changing the initial positions of the barycenters of each of the sub-pixels, but while applying rotation through about 18.43°, both the vertical and the horizontal alignments of black spaces between the sub-pixels are broken, which normally favors disappearance of structure effects that are visible in the images when viewed from close up, particularly since the almost complete disappearance of frosted front faces on screens and in spite of their ever-increasing resolutions. The compatibility of screens transformed in this way with autostereoscopy techniques is also improved.

Figure 3B:
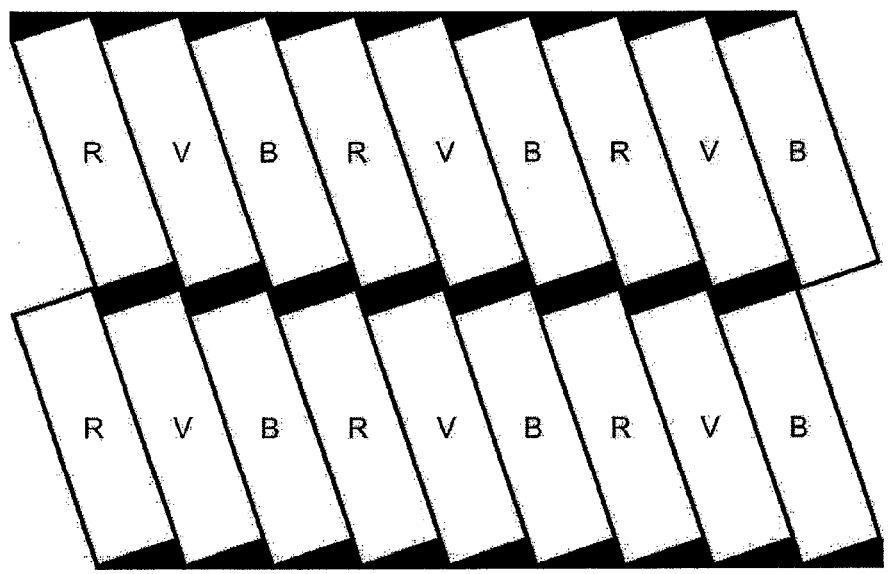
FIG. 3b shows a variant of such a screen.

The structure shown in FIG. 3b is very similar, but is characterized by wider spaces between rows.

When looking closely at FIGS. 2 and 3a or 3b, it can be seen that there is a very slight offset between the facing short sides of sub-pixels of different colors in alignment along the axis sloping at about 18.43°. This offset corresponds to the width of the black lines parallel to the long sides of the sub-pixels (black spaces between the columns). Thus, these black lines are broken and are no longer perceptible when these screens are used in autostereoscopy, in spite of the still-existing loss of 50% brightness on changing observation viewpoints, which corresponds to changing the sub-pixels seen through the optical selector. This variation in brightness is constant regardless of the width of these black lines, however it is visible in only a very small portion of the solid angle in which each of the viewpoints is observed. The finer the black lines, the shorter the length of time that this loss of brightness is perceptible.

New screen technologies, in particular those using organic light-emitting diode (OLEDs) make it possible to eliminate black spaces between sub-pixels. A screen of this type is very suitable for autostereoscopy, and does not present any moiré pattern on changing viewpoints.

In contrast, other screens present black spaces between sub-pixels that are very wide because the brightness of the sub-pixels makes that possible and because color contrast and saturation are improved thereby.

Figure 4A:
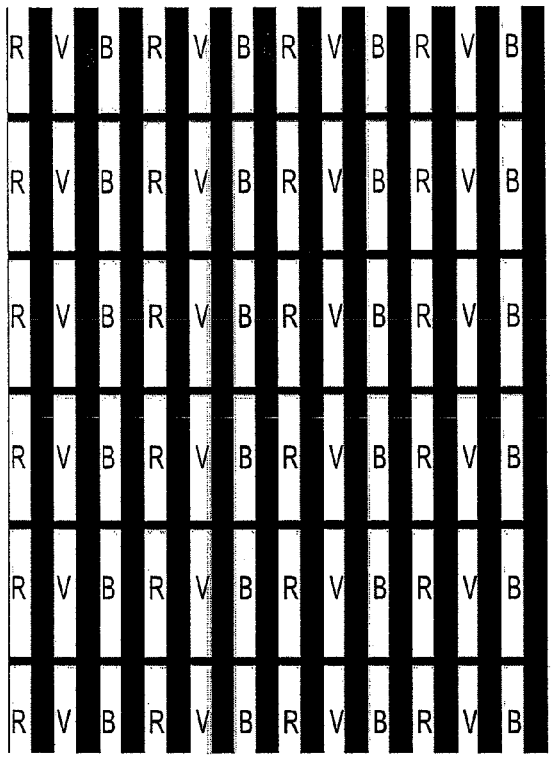
FIGS. 4a to 4e show third and fourth embodiments of the invention, characterized by black separating spaces between columns of sub-pixels, the spaces presenting a width that is approximately equal to the width of said columns.

FIG. 4a shows a screen of a configuration that is not part of the invention in which the columns of sub-pixels are separated by vertical black lines that are as wide as a sub-pixel. The screen thus presents a succession of illuminated vertical lines and of black vertical lines having the same width. Even while remaining in a system having three primary colors (RGB), the width/height ratio of each sub-pixel (considered as being rectangular) is no longer 1 to 3, but rather 1 to 6.

It is possible to consider that the vertical black lines are in fact columns of sub-pixels that are always off: the screen behaves as though it were in fact a six-color screen (N=6), but with it being impossible to switch on every other sub-pixel.

In this new system, the angle formed by the diagonal of a sub-pixel is 9.2° instead of 18.43°.

Figure 4B:
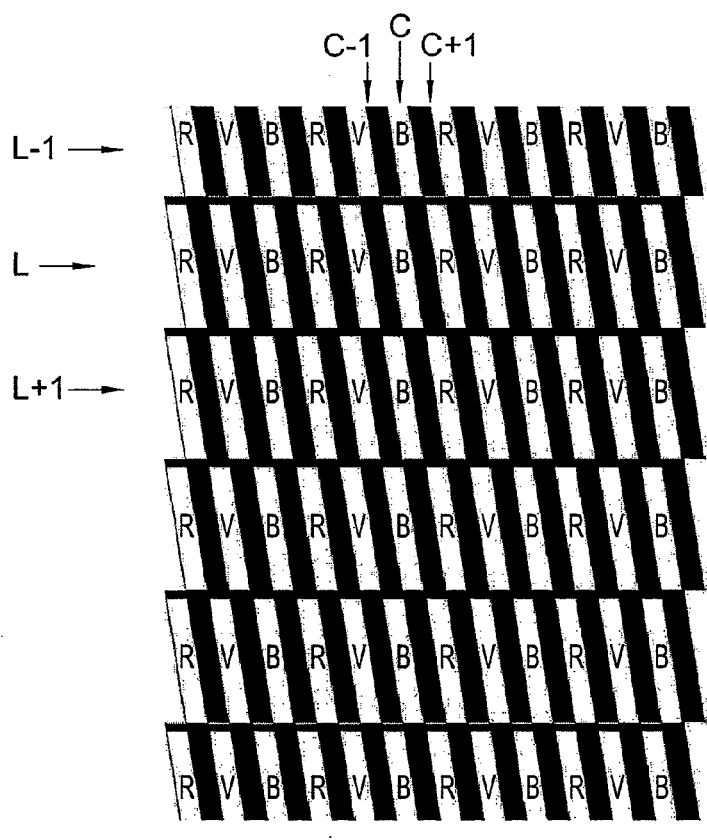
Figure 4C:
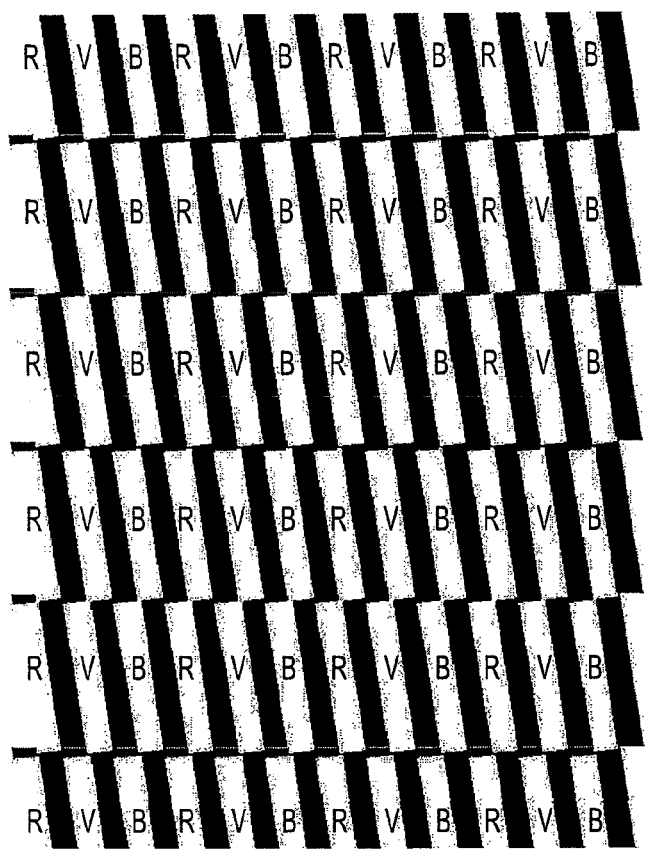

The sub-pixels may be deformed into parallelograms having long sides sloping at 9.2° relative to the vertical (FIG. 4b) or they may retain their shape or rectangular envelope, merely by being turned through 9.2° (FIG. 4c), as explained above. Either way, a structure is obtained in which the short side at the bottom of a sub-pixel in row L and column C lies above the short side at the top of the black "sub-pixel" of row L+1 and of column C+1, while the short side at the top of the sub-pixel of row L and column C lies under the short side at the bottom of black "sub-pixel" of row L−1 and of column C−1.

Thus, each sub-pixel is surrounded by four black zones having the same shape, thereby improving contrast and saturation. The screen thus presents a checkerboard structure with one or two axes (FIG. 4b or FIG. 4c) inclined at about α=9.2° relative to the vertical. It should be observed that as in the configuration of FIGS. 2, 3a, and 3b, the barycenters of the sub-pixels of any given color remain in alignment in a vertical direction.

It should be emphasized that in this embodiment, the following equation applies:

$$\alpha = 0.5(1+\epsilon)\tan^{-1}(1/N) = (1+\epsilon)\tan^{-1}(Lg/H)$$

in which, as explained above, the parameter ε accommodates a departure from the ideal value.

This structure is particularly well adapted to autostereoscopy. If an optical selector is positioned at its optimum utilization distance (the focal distance for a lens array) from the surface of such a screen, it is possible to double the number of viewpoints without modifying the pitch of the selector, merely by displaying odd viewpoints on odd rows and even viewpoints on even rows (or vice versa). The checkerboard structure guarantees constant brightness regardless of the position of the observer and regardless of the viewpoint observed through the optical selector. Transitions are sharp and very fast and no moiré pattern can appear.

Compared with the screens of FIGS. 2, 3a, and 3b, another advantage is that the angle formed by the axes of the optical selector relative to the vertical (still equal to α) is now 9.2° instead of 18.43°, thereby improving consistency between the top and the bottom of the screen.

Figures 4D, 4E:
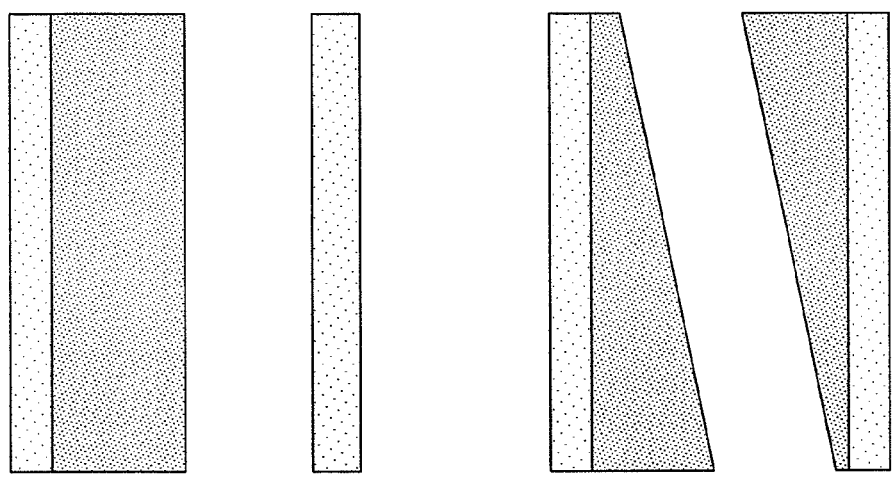

A screen of the type shown in FIG. 4a can be obtained from a screen presenting sub-pixels that are contiguous or almost contiguous, merely by depositing an opaque coating on portions of its surface. The deposition may be performed by means of a mask presenting a unit pattern of the type shown in FIG. 4d. In order to obtain a screen of the invention in accordance with the embodiment of FIG. 4b, it suffices to modify this unit pattern as shown in FIG. 4e. It is possible to proceed in analogous manner in order to obtain a screen of the type shown in FIG. 4c.

Figure 5A:
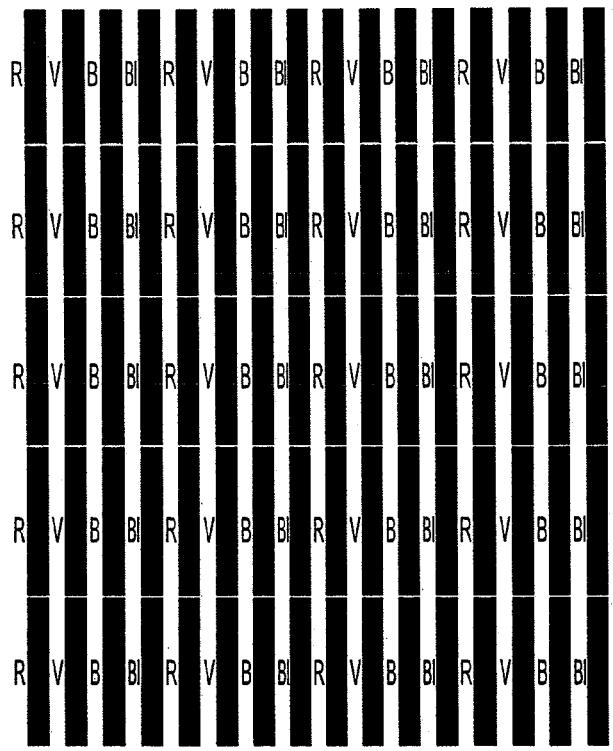
FIGS. 5a, 5b, and 5c correspond to FIGS. 4a, 4b, and 4c, except that they relate to four-color screens.
Figure 5B:
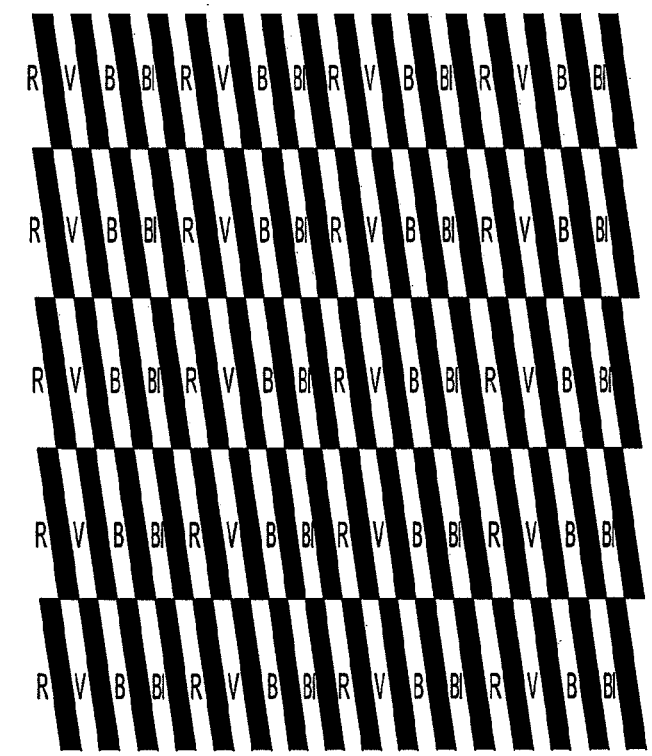
Figure 5C:
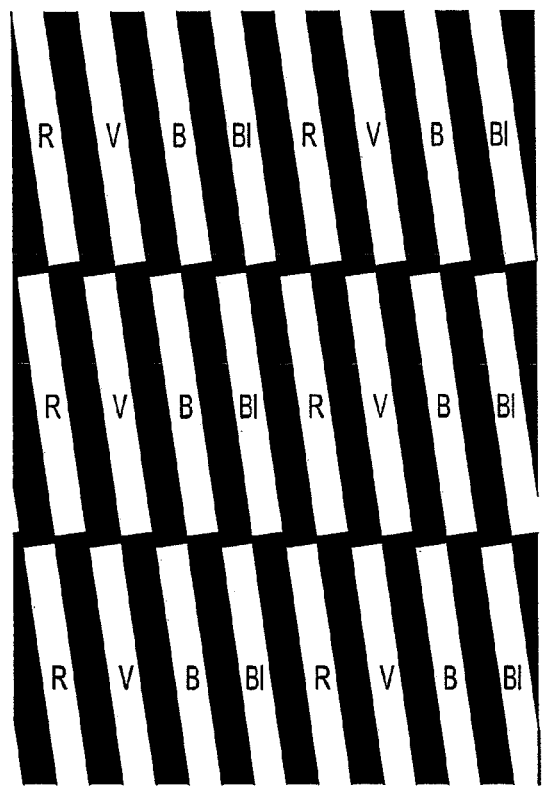

As mentioned above, some screens use more than three colors—e.g. N=4 with sub-pixels that are red (R), green (V), blue (B), and white (Bl); this applies for example to the OLED screens from the supplier LG. The invention is also applicable under such circumstances, except that the value of the angle α is reduced (for N=4, α≈14° with fine black lines, and α≈7° with black lines having the same width as the sub-pixels). FIGS. 5a, 5b, and 5c show screens similar to those of FIGS. 4a, 4b, and 4c, respectively, but with N=4.

Several variants may be applied to the invention.

The invention applies to any type of screen, and in particular a flat screen, regardless of the technology it implements, providing the sub-pixels are in alignment in the row direction.

The sub-pixels may be directly touching or they may be separated by black spaces of greater or lesser width—in the limit, the black spaces may even be wider than the sub-pixels themselves; they may be of a shape that is simple (rectangular, parallelogram) or complex (chevron, . . . ), and they may even be interleaved. FIGS. 7a to 7e show examples of screens known in the prior art that present sub-pixels of complex shape having grids of rectangular envelopes superposed thereon. These screens may be converted into screens of the invention merely by turning these rectangular envelopes or by deforming them into parallelograms, as discussed above with reference to FIGS. 1 to 3b.

The angle α may depart from the values given by the equations shown above, but should generally lie in the range 5° to 20°, approximately.

The invention makes it possible to improve display quality regardless of the resolution of the screen, both during "normal" display and during autostereoscopic display, or indeed during a stereoscopic display using eyeglasses.

The invention claimed is:

1. A display screen (E) comprising a matrix of pixels (P) arranged in rows and columns perpendicular to said rows, each pixel comprising three or more sub-pixels (SP) of different colors (RGB), in alignment in the direction of said rows and presenting a shape that is elongate, the screen being characterized in that each said sub-pixel presents a main dimension forming a same non-zero angle α relative to the direction of said columns, and in that the short top and bottom ends of each sub-pixel, with the exception of those in the first and the last rows face:
   either, respectively, short bottom and top ends of sub-pixels belonging to other rows and presenting other colors, with an offset between short ends of sub-pixels facing each other,
   or else black regions of the screen with the shape of a sub-pixel.

2. A display screen according to claim 1, wherein the barycenters (BC) of the sub-pixels of any one color belonging to different rows are in alignment in the direction of said columns.

3. A display screen according to claim 1, wherein said sub-pixel is surrounded by four sub-pixels, two in the direction of said main dimension and two in a perpendicular direction, the surrounding sub-pixels being of colors different from the color of said sub-pixel.

4. A display screen according to claim 1, wherein each said sub-pixel is inscribed within a parallelogram having short sides oriented in the direction of said rows.

5. A display screen according to claim 1, wherein each sub-pixel is inscribed within a rectangle having short sides forming an angle $\alpha$ relative to the direction of said rows.

6. A display screen according to claim 1, wherein the adjacent sub-pixels are separated by black spaces.

7. A display screen according to claim 1, wherein said angle $\alpha$ is given by the equation:

$$\alpha=(1+\epsilon)\tan^{-1}(1/N)$$

where $\epsilon$ is a parameter lying in the range −0.1 to +0.1, and N is the number of sub-pixels included in each pixel.

8. A display screen according to claim 6, wherein the sub-pixels that are adjacent in the direction of said rows are separated by black spaces of width substantially equal to the width of a sub-pixel, and wherein said angle $\alpha$ is given by the equation:

$$\alpha=0.5(1+\epsilon)\tan^{-1}(1/N)$$

where $\epsilon$ is a parameter lying in the range −0.1 to +0.1, and N is the number of sub-pixels included in each pixel.

9. A display screen according to claim 1, fitted with an angle selection array (SO) for autostereoscopic display having main axes forming an angle $\alpha$ relative to the direction of said columns and at a pitch that enables M≥2 sub-pixels to be covered.

* * * * *